United States Patent
Bae et al.

(10) Patent No.: US 8,402,269 B2
(45) Date of Patent: Mar. 19, 2013

(54) SYSTEM AND METHOD FOR CONTROLLING EXIT OF SAVED DATA FROM SECURITY ZONE

(75) Inventors: Steve Bae, Seoul (KR); Do-Gyun Kim, Gyeonggi-do (KR); Aiden Kang, Seoul (KR); Hee-Gook Lee, Bucheon-si (KR); Jong-Deok Baek, Gunpo-si (KR); Yang-Jin Seo, Seoul (KR)

(73) Assignee: Softcamp Co., Ltd., Seoul (KR)

( * ) Notice: Subject to any disclaimer, the term of this patent is extended or adjusted under 35 U.S.C. 154(b) by 323 days.

(21) Appl. No.: 12/782,568

(22) Filed: May 18, 2010

(65) Prior Publication Data

US 2010/0228937 A1 Sep. 9, 2010

Related U.S. Application Data

(63) Continuation-in-part of application No. 10/598,218, filed on Aug. 21, 2006, now abandoned.

(30) Foreign Application Priority Data

Feb. 24, 2004 (KR) ........................ 10-2004-0012380

(51) Int. Cl.
   *G06F 21/00* (2006.01)
(52) U.S. Cl. .......................................... 713/165; 726/30
(58) Field of Classification Search .................. None
   See application file for complete search history.

(56) References Cited

U.S. PATENT DOCUMENTS

| | | | |
|---|---|---|---|
| 5,455,926 A | 10/1995 | Keele et al. | |
| 6,075,858 A | 6/2000 | Schwartzman | |
| 6,108,719 A | 8/2000 | Klein | |
| 6,272,611 B1 | 8/2001 | Wu | |
| 6,314,437 B1 | 11/2001 | Starek et al. | |
| 6,647,481 B1 | 11/2003 | Luu et al. | |
| 6,792,519 B2 * | 9/2004 | Constable et al. | 711/163 |
| 7,000,250 B1 | 2/2006 | Kuo et al. | |
| 7,260,726 B1 | 8/2007 | Doe et al. | |
| 7,260,820 B1 | 8/2007 | Waldspurger et al. | |
| 7,428,636 B1 | 9/2008 | Waldspurger et al. | |
| 7,603,533 B1 | 10/2009 | Tsypliaev et al. | |
| 7,685,645 B2 * | 3/2010 | Doyle et al. | 726/27 |
| 2002/0095501 A1 | 7/2002 | Chiloyan et al. | |
| 2002/0095557 A1 | 7/2002 | Constable et al. | |
| 2002/0099944 A1 | 7/2002 | Bowlin | |
| 2002/0178271 A1 * | 11/2002 | Graham et al. | 709/229 |
| 2003/0076764 A1 * | 4/2003 | Iwano et al. | 369/99 |
| 2003/0115458 A1 * | 6/2003 | Song | 713/165 |
| 2003/0159070 A1 | 8/2003 | Mayer et al. | |
| 2004/0010701 A1 | 1/2004 | Umebayashi et al. | |
| 2004/0186971 A1 | 9/2004 | Meharchand et al. | |
| 2004/0199779 A1 | 10/2004 | Huang | |
| 2007/0050620 A1 | 3/2007 | Pham et al. | |
| 2008/0107261 A1 * | 5/2008 | Kistner | 380/29 |
| 2008/0141029 A1 * | 6/2008 | Culver | 713/165 |
| 2009/0100060 A1 * | 4/2009 | Livnat et al. | 707/9 |
| 2009/0119772 A1 * | 5/2009 | Awad et al. | 726/21 |
| 2010/0058476 A1 * | 3/2010 | Isoda | 726/26 |
| 2010/0199108 A1 * | 8/2010 | Abzarian et al. | 713/193 |
| 2011/0231378 A1 * | 9/2011 | Seo et al. | 707/694 |

\* cited by examiner

*Primary Examiner* — Nathan Flynn
*Assistant Examiner* — Michael R Vaughan
(74) *Attorney, Agent, or Firm* — IPLA P.A.; James E. Bame

(57) ABSTRACT

A system for controlling exit of saved data from a security zone, comprising an access control device, the access control device comprising an access detection module for detecting access of an application to a security zone and access of an application to a general zone, a target checking module for comparing the application, detected by the access detection module, with a list and then controlling access of the application to the security zone and access of the application to the general zone, and a processing control module for controlling writing of data of the application to the general zone.

12 Claims, 17 Drawing Sheets

SYSTEM AND METHOD FOR CONTROLLING EXIT OF SAVED DATA FROM SECURITY ZONE

CROSS REFERENCE

This application is a continuation-in-part of application Ser. No. 10/598,218 filed Aug. 21, 2006 which claims foreign priority under Paris Convention via Patent Cooperation Treaty to Korean Patent Application No. 10-2004-0012380, filed Feb. 24, 2004, with the Korean Intellectual Property Office, where the entire contents are incorporated herein by reference.

BACKGROUND OF THE INVENTION

1. Technical Field

The present invention relates to an access control system that is configured to prevent data (files containing program source code or design drawings), which are integrally managed on a local area network or a shared personal computer, from being leaked by internally authorized persons, and to block access by external persons.

2. Description of the Related Art

Companies or public institutions operate the information security solution such as firewalls and Intruder detection system to block access by persons who do not meet certain requirements or to prevent the intrusion into data at the time of connecting with an external network so as to prevent the illegal leakage of information through unauthorized access from the outside and to protect important internal secret information and other internal information. However, the information security solution is only application preventing external intruders from accessing a Local Area Network (LAN) or a Personal Computer (PC), and are not capable of preventing the case of persons with internal authorization from leaking out the information.

Accordingly, in order to prevent the exposure of companies' or public institutions' important information to the public by internally authorized persons and the illegal leakage of the information, a security system that is conceptually different from such firewalls is demanded.

To meet the demand, conventionally, only a person who has the authority to use a PC is allowed to use the PC because of a booting process continuing only after password input using password authentication process has been performed by a Basic Input and/or Output System (BIOS) before an Operating System (OS) booting process, or, a Data Base (DB) determines whether a client PC gains access by determining whether the client PC, which is requesting access to the DB, has been authorized to access the DB while grouping and separately managing the security-sensitive data at the time of accessing a main server via a LAN.

In addition, only persons who have proper authority are allowed to access a DB in which security-sensitive data is stored or to use a PC using a separate biometric apparatus using biometrics, such as fingerprint or iris recognition.

However, the above-described prior art related to internal authorization remains defenseless with regard to data leakage because the authorized persons may use the DBs and PCs to leak out security-sensitive data themselves. Furthermore, as technology is becoming complicated, subdivided and specialized, access to and editing of shared data by a plurality of authorized persons who are working on a single technology is required, so that all internally authorized persons are allowed to access a DB in which shared data are stored without limiting access to the DB, or security-sensitive data and general data can be integrally managed in a single DB.

Accordingly, in addition to the demand for a technique that prevents data leakage by internally authorized persons, a control system and method that allows access to and editing of data that are integrally managed in a DB or a hard disk are facilitated without the addition of separate high priced equipment, such as a biometric recognition apparatus, or the use of a complicated checking process, such as password input and user authentication.

Meanwhile, in the case of encrypting existing security-sensitive documents or granting authority to use the files, for programs that create a plurality of extensions and temporary files based on file name extensions, such as a Computer Aided Design (CAD) program or a program compiler, the prior art is disadvantageous in that it is difficult to encrypt the corresponding files or grant authority to use the corresponding files.

SUMMARY OF THE INVENTION

A system for controlling exit of saved data from a security zone, comprising an access control device, the access control device comprising an access detection module for detecting access of an application to a security zone and access of an application to a general zone, a target checking module for comparing the application, detected by the access detection module, with a list and then controlling access of the application to the security zone and access of the application to the general zone, and a processing control module for controlling writing of data of the application to the general zone.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF SPECIFIC EMBODIMENTS

Figure 1:
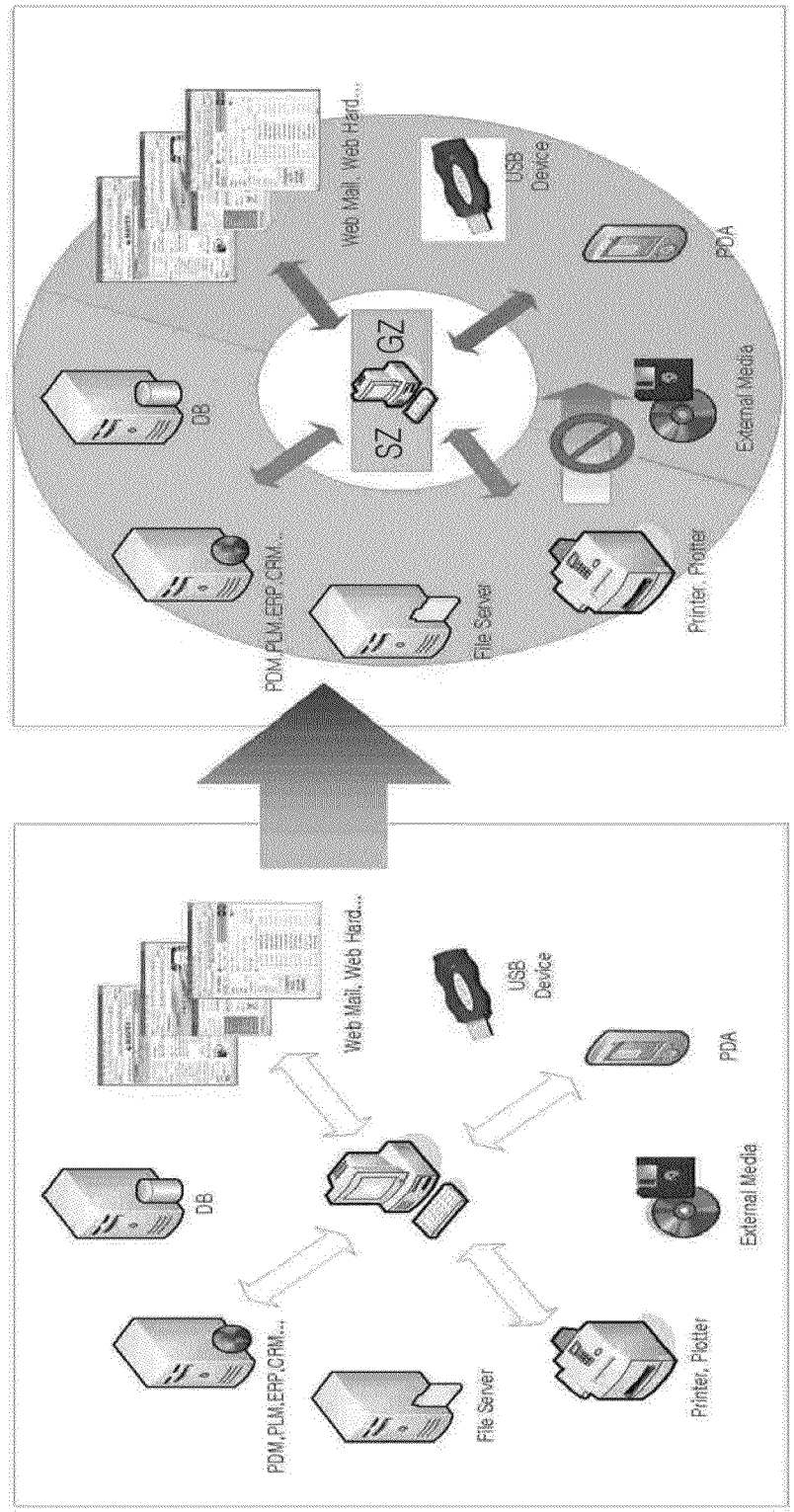
FIG. 1 is an image showing an environment to which a control system according to the present invention may be applied.

Reference now should be made to the drawings, in which the same reference numerals are used throughout the different drawings to designate the same or similar components.

Figure 2:
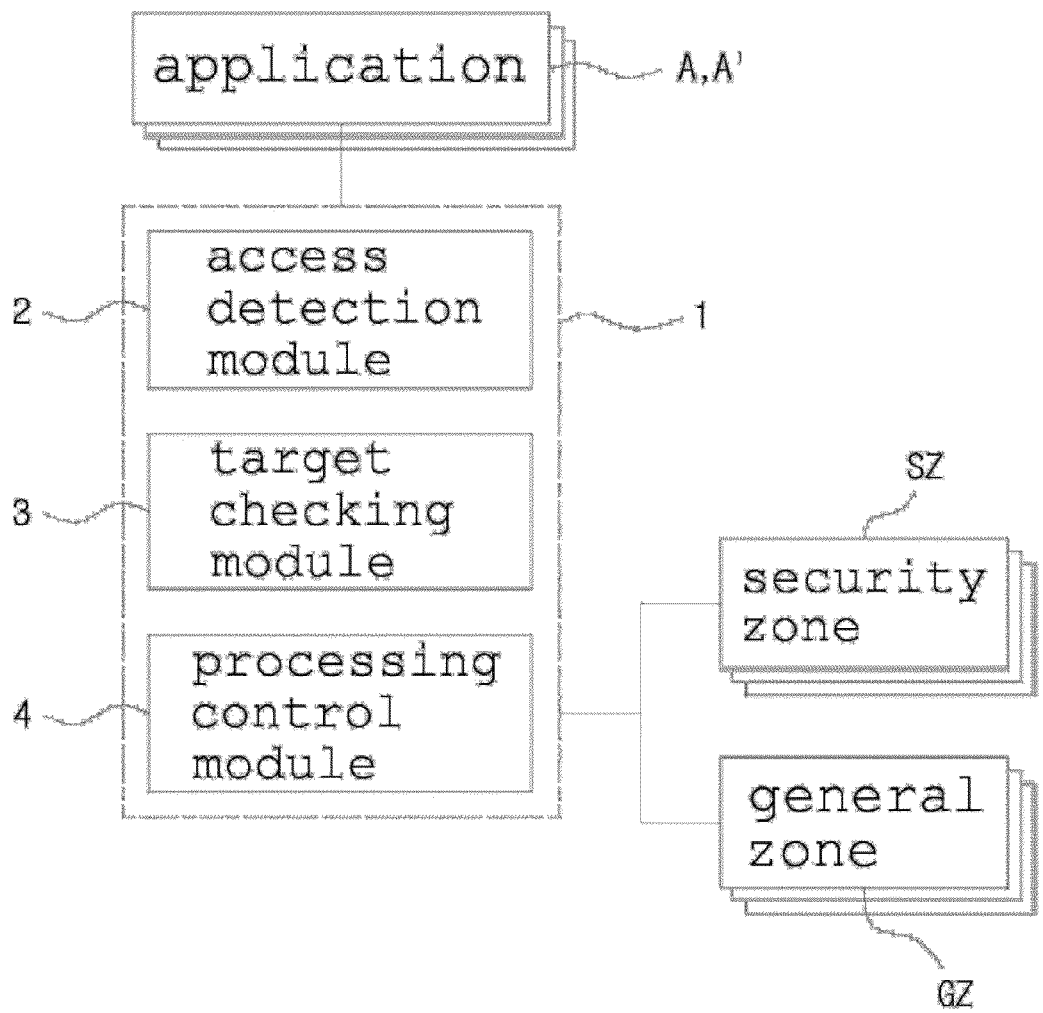
FIG. 2 is a block diagram of the control system according to the present invention.

FIG. 1 is an image showing an environment to which a control system according to the present invention may be applied. FIG. 2 is a block diagram of the control system according to the present invention. The following description will be given in conjunction with these drawings.

A typical local terminal (which is located at the center of the drawing) communicates with other terminals over a network. The terminals which constitute a network and communicate with each other may be divided into security zones SZs and general zone GZs according to the purpose and necessity.

Meanwhile, in a communication environment in which a number of terminals is connected to each other over a network, the exit of security-target data from a security zone to a general zone must be strictly controlled. Here, although the division between a security zone and a general zone may be made at a terminal level, the division may be made at the level of the hard disk of a local terminal which is directly manipulated by an individual.

Concurrently, the control system according to the present invention includes an access control device 1 for detecting the application A or A' accessing the security zone SZ or general zone GZ and controlling the processing of the data of the security zone SZ or general zone GZ. Here, the access control device 1 checks the application A or A' accessing the security zone SZ or general zone GZ, determines whether the zone which is being accessed by the application A or A' is a security target, and controls the processing of corresponding data.

The access control device 1 includes an access detection module 2 for detecting the access of the application A or A' and checking the process information and/or access path of the application A or A', a target checking module 3 for checking whether the application A or A' is the process of a security target application, checking a zone which is being accessed by the application A or A', and determining whether the zone is a security zone SZ or a general zone GZ, and a processing control module 4 for controlling the processing of corresponding data by the application A or A' in accordance with the results of the checking of the target checking module 3.

For reference, the access control device 1 can be implemented using various types of means, such as filtering, hooking, and SST modulation. In the following description, a process of providing security to the data of a security zone SZ using SST modulation will be presented as an embodiment.

Meanwhile, when the hard disk of a local terminal is configured to be divided into a security zone SZ and a general zone GZ, the security zone SZ is constructed of a security image file module 410 (refer to FIG. 5) and the security zone SZ is recognized as an independent drive by an Operating System (OS). Here, the security zone SZ is represented by the security image file module 410, and a security-sensitive file 440 which is security target data is processed within the range of the security image file module 410 by the security drive 420.

For reference, the security image file module 410, which will be described in detail below, is a zone which is set on the hard disk of a local terminal in the form of a file, the security drive 420 is an element for forming a disk volume so that the security image file module 410 can be recognized as an independent drive by an OS, and the security file system module 430 enables the OS to input and output data (a file) to and from the security image file module 410 which is recognized as an independent drive by the security drive 420. Accordingly, the security image file module 410, the security drive 420 and the security file system module 430 process the reading or writing of the security-sensitive file 440 saved in the security image file module 410 while operating under the control of the access control device 1.

A detailed description thereof will be given below.

Figure 3:
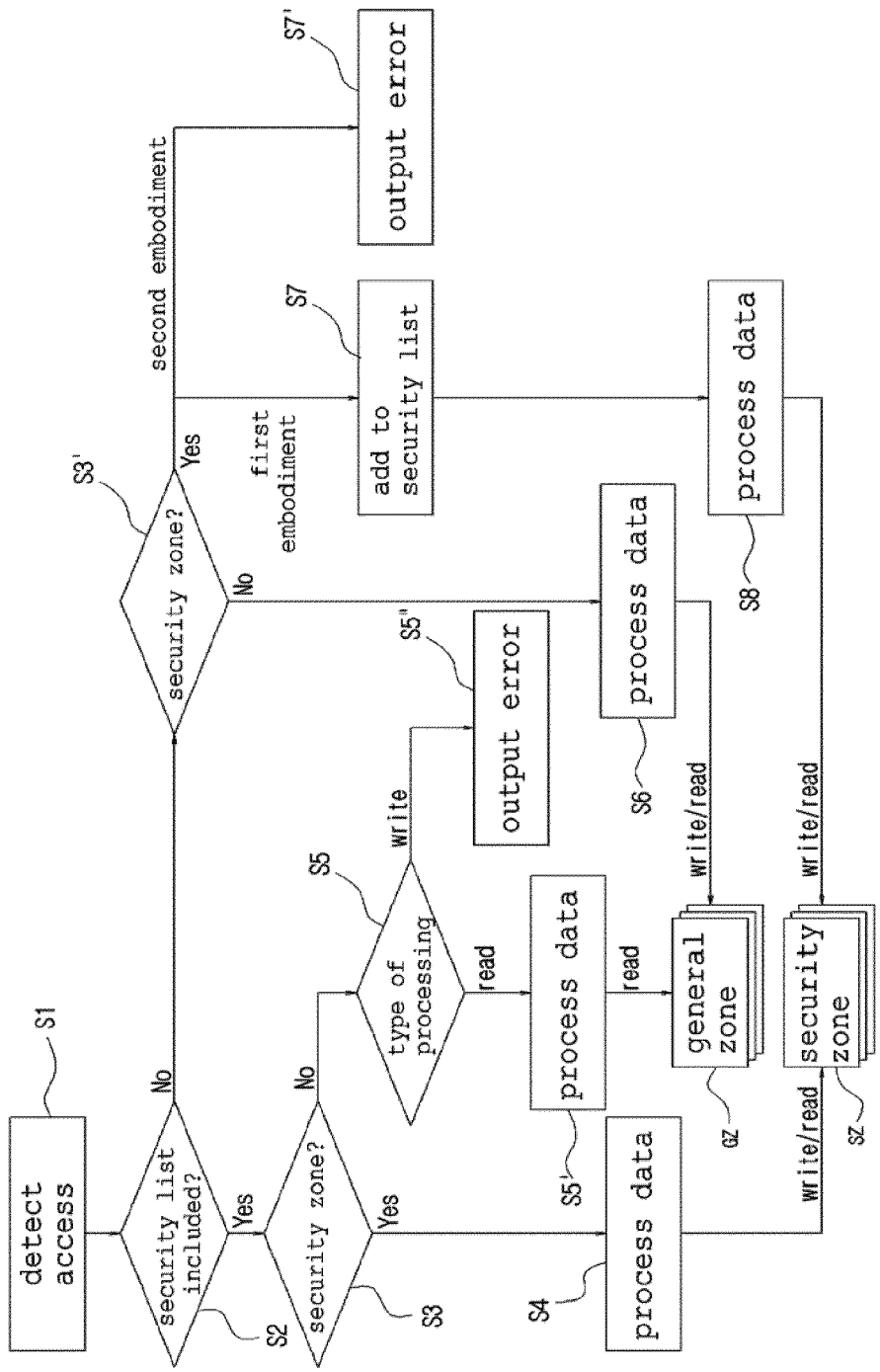
FIG. 3 is a flowchart showing a control method according to the present invention.

FIG. 3 is a flowchart showing a control method according to the present invention. Referring to this drawing, the operation of the access control device 1 will be described in sequence.

S1; Access Detecting Step

The access detection module 2 provided in the access control device 1 detects an attempt by the application A or A' to access the security zone SZ and an attempt by the application A or A' to access the general zone GZ and detects the paths thereof. Here, the application A or A' is checked in order to check whether the corresponding application A or A' has been included in a list, and the path is checked in order to check the location of data which the corresponding application A or A' desires to process.

For reference, the application A or A' can be identified using a process which is executed when the application A or A' runs. As is well known, such a process is created when the application A or A' runs, and enables the OS to continuously identify the application A or A'. When the application A or A' requests a function for data processing from the OS while running, the OS identifies a target to which the corresponding function will be transferred by checking the process. It will be apparent that the process will be deleted when the application A or A' stops running.

Since a technology related to such a process is a well-known and habitually-used technology as described above, an additional description thereof will be omitted here.

Although in the above-presented embodiment, the access detection module 2 has been described as identifying the corresponding application A or A' using the process created by the application A or A', it will be apparent that one of methods of identifying the application A or A' using a unique identification code, such as a program name, a header, a checksum or a certificate, may be used.

Meanwhile, the target checking module 3 of the access control device 1 includes a function of preventing the OS or corresponding application A or A' from performing a subsequent task by changing an existing data processing path. For this purpose, an API hook or data hook function may be used. In the embodiment of the present invention, a technology in which a security service table NSST (refer to FIG. 8) is executed in place of a system service table SST (refer to FIG. 7) and the access control device 1 protects data while performing the function of a security table NST will be disclosed below. However, the data security scheme of the access control device 1 using the security service table NSST and the security table NST is merely one of a number of embodiments for practicing the technical spirit of the present invention, it will be apparent that it may be modified and practiced in various manners within a range which does not depart from the accompanying claims.

S2; List Checking Step

The target checking module 3 determines whether the corresponding application A or A' has been set as a security target by searching a list for the process of the application A or A' detected by the access detection module 2.

For reference, a security target may be set in real time without the determination of whether the application A or A' has been authorized. Alternatively, a security target may be set after the division into an authorized application or an unauthorized application.

In the former case (a first embodiment), the access control device 1 allows the application A or A' to access both the general zone GZ and the security zone SZ regardless of the applications A and A', but the processing of the data of the security zone SZ is limited.

In the latter case (a second embodiment), the access control device 1 determines whether an application has been authorized, and then allows only an authorized application to access the security zone SZ. Whether an application has been authorized may be determined using a list in which unique identification codes used to identify authorized applications, such as program names and process names, have been stored.

FIG. 3 shows the first and second embodiments of the control method according to the present invention. The first and second embodiments will be described in detail below.

Thereafter, if the target checking module finds the processes of the applications A and A' in the list (or determines the applications A and A' to have been authorized), the process proceeds to a subsequent step.

S3; Zone Checking Step

The target checking module 3 checks a zone which is being accessed by the application A or A' by checking the access path of the application A or A' detected by the access detection module 2. Here, security zones SZs may be managed using a list in order to distinguish them from general zones GZs. The target checking module 3 may determine whether a zone being accessed by the application A or A' is a security zone SZ by searching the list for the access path.

S4; Data Processing Step

The processing control module 4 allows or stops the processing of data being attempted by the application A or A' according to the results of the determination of the target checking module 3.

At this step, the processing control module 4 allows the application A or A' to read or write the data from or to the security zone SZ without checking the type of processing being attempted by the application A or A' because the application A or A' has been checked and the location of the data to be processed by the application A or A' is determined to be the security zone SZ.

Here, 'reading' is a term representative of the 'retrieving' and 'outputting' of data, and 'writing' is a term representative of the 'copying', 'pasting' and 'saving' of data and 'picture editing using a print screen feature PrtSc'. In the detailed description and claims of the present application, the terms 'reading' and 'writing' are not concepts including only the 'reading' and 'writing' of data, respectively, but are explicitly defined as including a function of retrieving or outputting data and a function of pasting or storing data, respectively.

S5, S5', and S5"; Processing Type Checking Step

Meanwhile, if the target checking module 3 determines the zone being accessed by the application A or A' to be a general zone GZ, the processing control module 4 checks the type of processing being attempted by the application A or A', and allows the processing of data if the type of processing is reading and stops the processing of data if the type of processing is writing, using the security drive 420. When the processing of data is stopped, a help window for notifying a user of this may pop up.

As a result, the application A or A' cannot copy the data of the security zone SZ to the general zone GZ or cannot cut the data, so that the illegitimate exit of the data of the security zone SZ to the general zone GZ can be prevented. This can be applied regardless of whether an application has been authorized, and the illegitimate exit of data by internally authorized persons is limited.

Steps performed when the target checking module 3 has not found the application A or A' in the list at the list checking step S2 will be described below.

S3'; Zone Checking Step

Since this zone checking step S3' is the same as the zone checking step S3, a description of the zone checking step S3' will be omitted here.

S6; Data Processing Step

If the zone, the access to which is being attempted by the application A or A', is determined to be the general zone GZ at the security zone checking step S3', the processing control module 4 allows the application A or A' to read or write the data from or to the general zone GZ without checking the type of processing being attempted by the application A or A'.

S7; List Entry Adding Step

Meanwhile, in the first embodiment, if the zone, the access to which is being attempted by the application A or A' is determined to be a security zone SZ at the zone checking step S3', the processing control module 4 additionally registers the temporary identification code of the corresponding application A or A', such as process information, in the list. That is, since the first embodiment does not employs the method of determining whether the application A or A' has been authorized and imposing limitation but employs the method of allowing the access of all applications A and A' to the security zone SZ, the access to the security zone SZ is allowed by additionally registering the temporary identification code at the list entry adding step S7, even if the temporary identification code of the application A or A' has not been found in the list at the list checking step S2.

S7'; Error Output Step

In contrast, in the second embodiment, if the zone, the access to which is being attempted by the application A or A', is determined to be a security zone SZ at the zone checking step S3', the processing control module 4 stops the access of the application A or A' to the security zone SZ or the processing of the data of the security zone SZ, and outputs a help window for notifying a user of this. That is, in the second embodiment, only an authorized application is allowed to access the security zone SZ and process related data.

S8; Data Processing Step

After the list entry adding step S7, the processing control module 4 allows the application A or A' having accessed the security zone SZ to process the data of the security zone SZ.

On the basis of the above description, detailed descriptions of the second embodiment and the access control device 1 will be given below.

Figure 4:
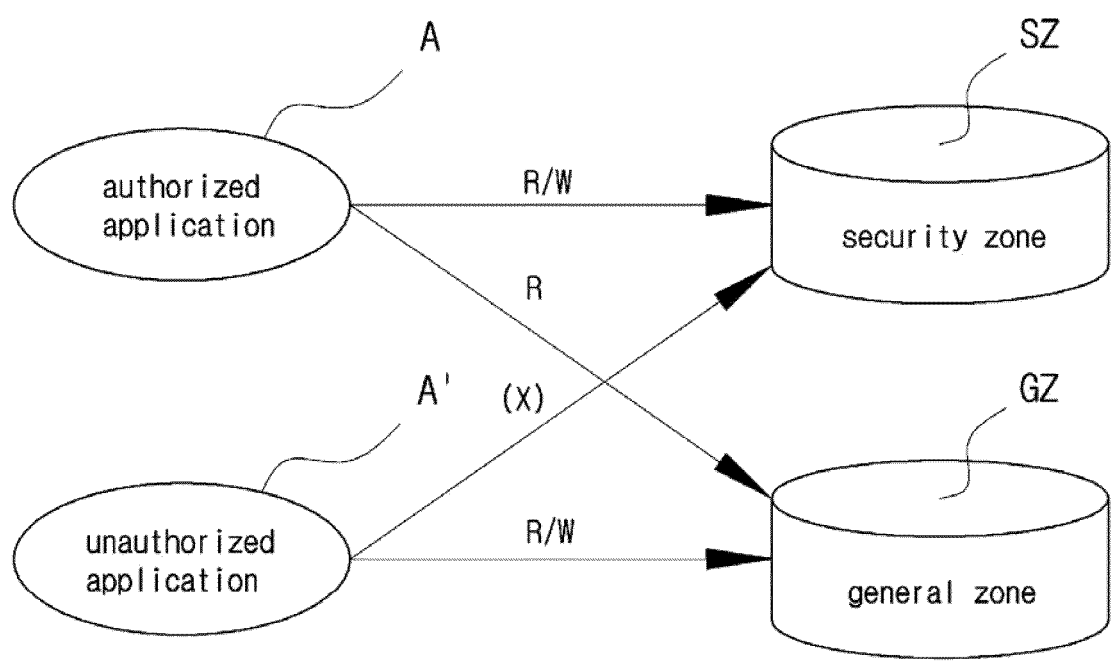
FIG. 4 is a block diagram illustrating the operation of a control system according to the present invention.

FIG. 4 is a block diagram illustrating the operation of a control system according to the present invention. The following description is made with reference to the drawing.

The access control system according to the present invention allows the reading and editing of security-sensitive data (files) to be freely performed using an authorized application A, which can process the files (in this case, operations of performing tasks, such as reading and/or writing from and to files) without an additional process, such as password input or authentication, at the time of access by internally authorized persons.

Meanwhile, access processes using an authorized application A and an unauthorized application A' are distinguished from each other by generating a security zone SZ without the physical partition of a hard disk (the hard disk is called a DataBase (DB) at the level of a server, but is used as a higher concept, including a DB as well as the hard disk of a general PC). The concept of the security zone SZ is described in more detail below.

That is, as shown in FIG. 4, the authorized application A can access the security zone SZ in which only files requiring security (hereinafter referred to as "security-sensitive files") are stored, and perform reading and writing R/W on the security-sensitive files. In contrast, the unauthorized module A' cannot perform reading and writing on the security-sensitive files (X), but can perform reading and writing on files stored on a general zone GZ other than the security zone SZ.

Meanwhile, the authorized application A can perform Read on the files stored on the general zone GZ, but cannot perform writing on the files. The reason for this is to prevent the security-sensitive files from being transferred to the general zone GZ and then stored thereon after updating the security-sensitive files stored on the security zone SZ (that is, storing the security-sensitive files using new names).

Figure 5:
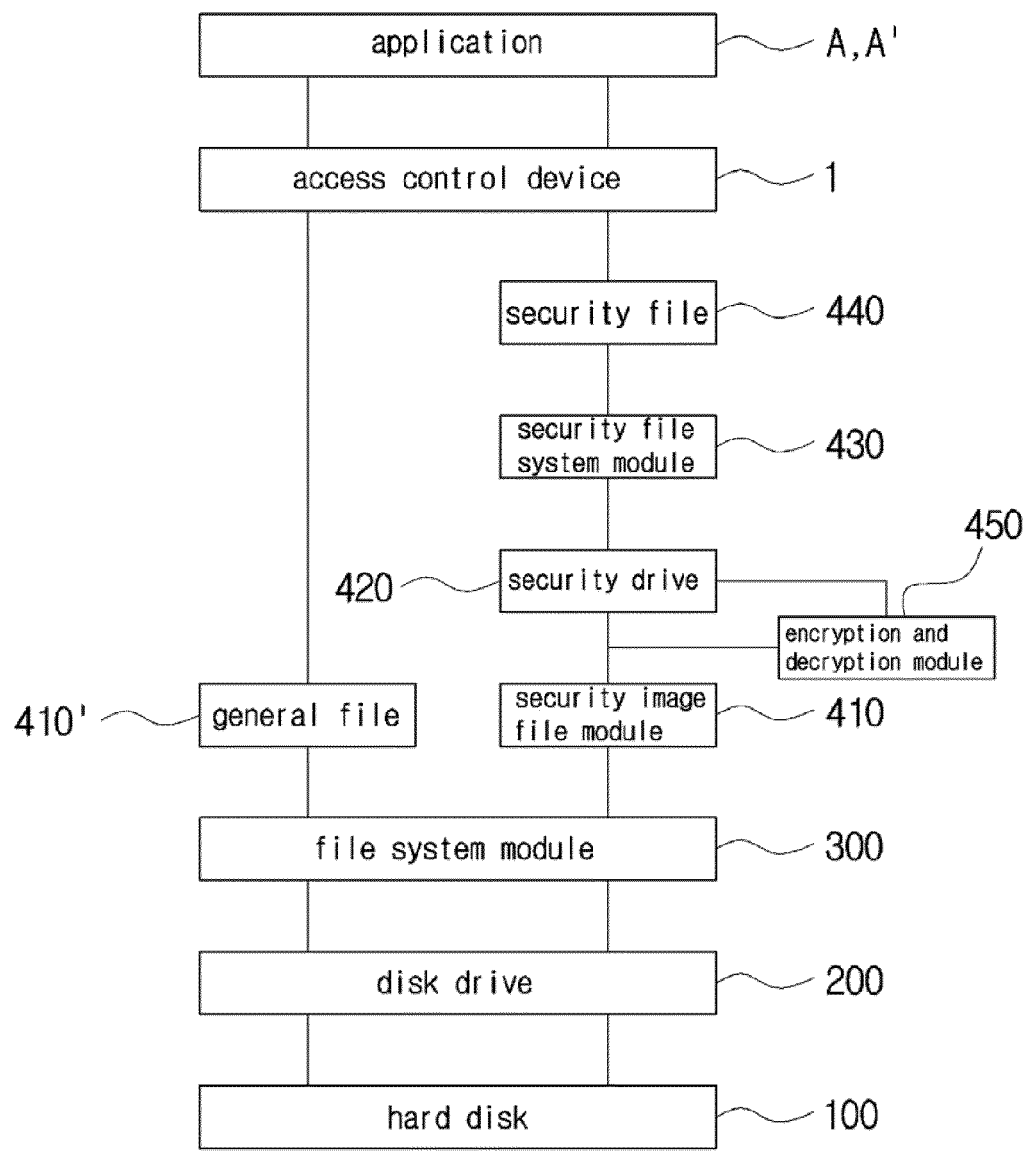
FIG. 5 is a block diagram showing the construction of the control system according to an embodiment of the present invention.

In order to perform the above-described function, the present invention is constructed as described below, and is described in more detail with reference to FIG. 5.

The access control system according to the present invention has a structure including a hard disk 100, a disk drive 200, a file system module 300, an application 600, a security image file module 410, a security drive 420, an encryption and decryption module 450, a security file system module 430, and an access control device 1.

The hard disk 100 basically stores data necessary to operate a PC or LAN, and the data are managed in file form by reading, deleting and editing using an OS.

The disk drive 200 includes disk volumes formatted to be compatible with the OS that manages the hard disk 100.

When the hard disk 100 is physically partitioned, a disk volume is assigned to each partitioned area. As a result, the OS manages the hard disk 10 while recognizing a single hard disk 100 as a plurality of disk drives.

The file system module 300 abstracts the physical characteristics of the hard disk 100, arranges the abstracted physical characteristics on a logical storage unit basis, and maps the arranged physical characteristics, thus allowing the OS to process the data on a file basis. Generally, the file system module 300 is installed to support the processing of the OS when the disk volume is recognized by the OS.

The application 600 is a general application program that is configured to fetch and execute files. In the present invention, the processing of the security-sensitive files is performed differently for the authorized application A authorized to access the security-sensitive files and the unauthorized application A' not authorized to access the security-sensitive files.

The authorization setting of the application 600 is performed to fetch information (ID, program names, headers, checksums and certificates of authentication) for identifying the types of the applications and then define identification rules. The access control device 3 operates according to the identification rules.

The security image file module 410 is created in file form within the disk volume formatted by the file system module 300.

The security drive 420 is the drive of the security image file module 410, which corresponds to the disk drive 200. That is, although the security image file module 410 is actually formed based on the concept of a file identical to that of a general file 410', it may be recognized as a general file or a single disk volume by the OS according to whether the application that attempts access to a corresponding file has been authorized. The security drive 420 is recognized as a disk drive different from the disk drive 200 when the authorized application A accesses the security image file module 410.

The security file system module 430 is set up such that the OS can recognize the security file system module 2 as a new disk volume at the time of the generation of the security image file module 410 and the security drive 420 and perform processing at the time of access to a file within the security image file module 410 using the authorized application A.

The security file system module 430 corresponds to the file system module 300.

Figure 6:
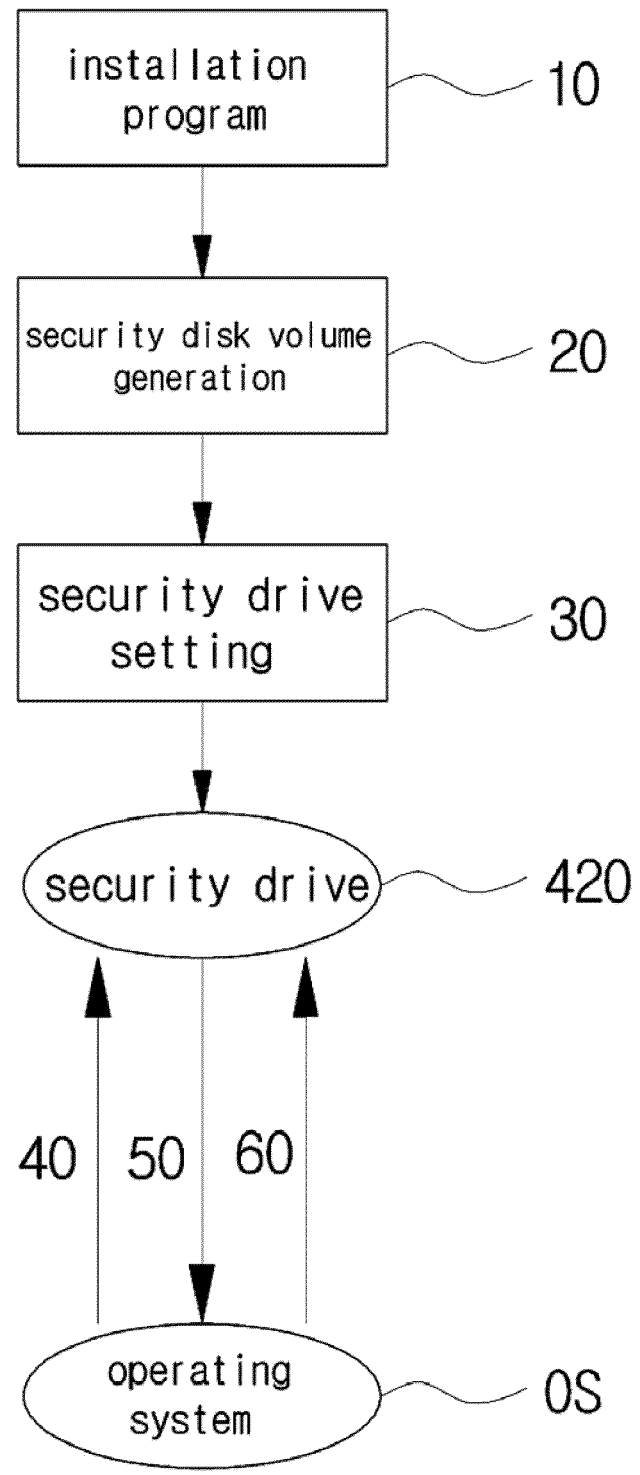
FIG. 6 is a block diagram illustrating a process of setting up a security zone of the control system according to the present invention.

FIG. 6 is a block diagram illustrating a process of setting up the security zone of the control system according to the present invention. The following description is made with reference to the drawing.

An installation program is installed on a corresponding PC or a client PC on a LAN (10), a security disk volume is created while occupying a region in a certain space of the disk volume in file form by a security disk volume generation means (not shown) of the installation program (20), and the security drive 420, that is, a means for executing the security disk volume, is set up by a security drive setting means (not shown) (30).

When the security drive 420 is set up, the OS requests information (DISK_GEOMETRY information and partition information) about a corresponding security disk volume (40), and the security drive 420 generates security disk volume information that is previously received and then transfers the generated information to the OS in response to the request (50). Furthermore, the OS receives the information, and sets up and formats the security file system module 430 in conformity with a range of the concerned information, and recognizes the new disk volume (60).

Figure 12:
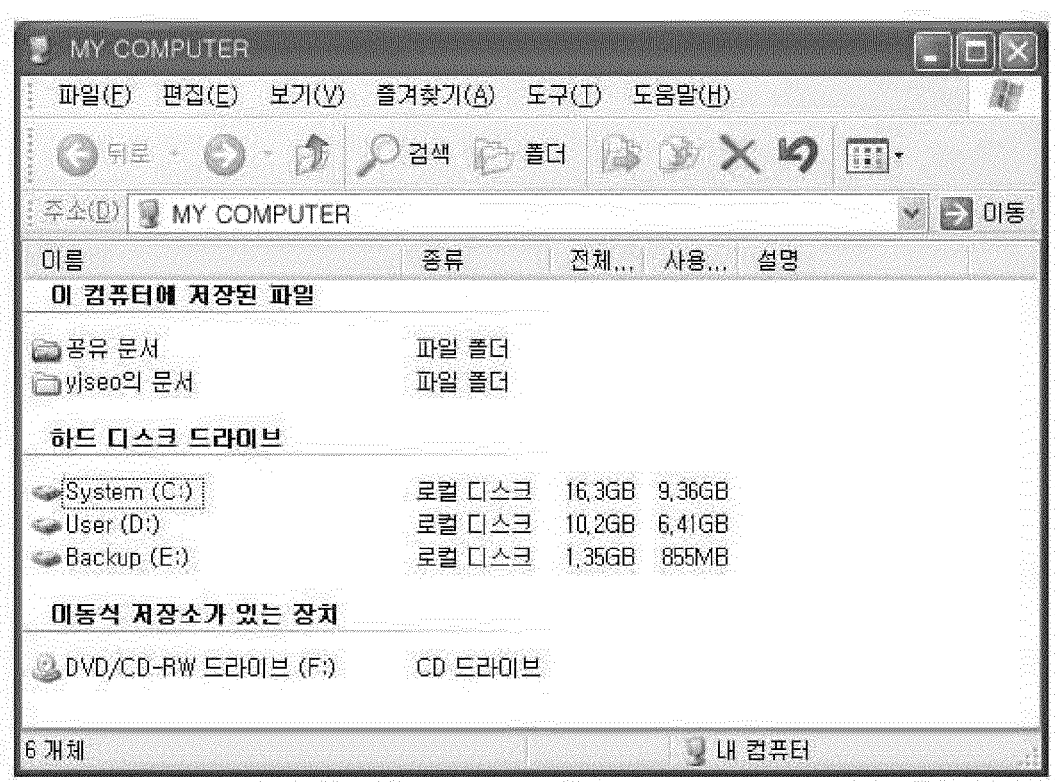
FIG. 12 is the "my computer" window showing the state before the access control system according to the present invention is installed.
Figure 13:
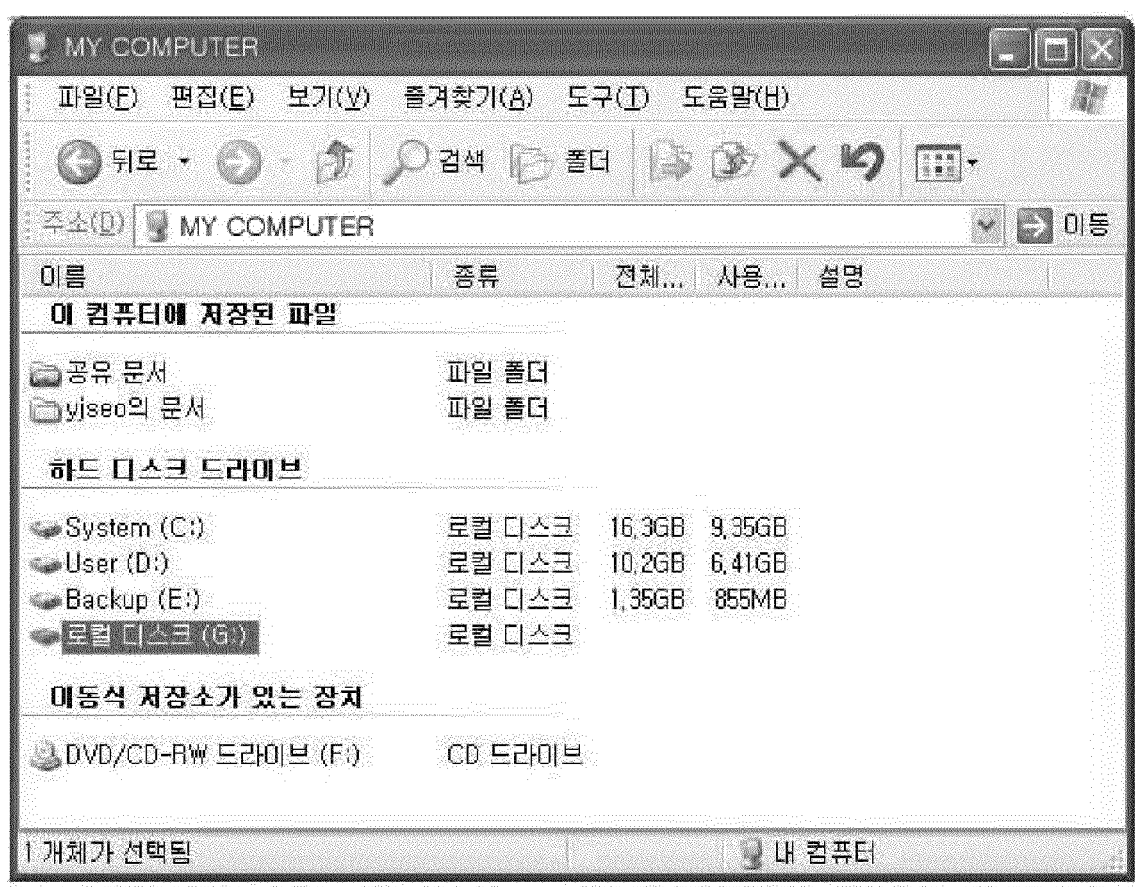
FIG. 13 is the "my computer" window showing the state after the access control system according to the present invention has been installed.

FIG. 12 is my computer window showing the state before the access control system according to the present invention is installed, and FIG. 13 is the "my computer" window showing the state after the access control system according to the present invention has been installed.

The OS recognizes a new hard disk drive as having been created by the security image file module 410 and the security drive 420.

The encryption and decryption module 450 is a module for encrypting and decrypting input and/or output data between the security image file module 410 and the security drive 420. If the input and/or output data are stored in the security image file module 410 without change, information about security-sensitive files may be leaked out by processing the security image file module 410 in the same format as the corresponding file system module 300 using an abnormal method, such as hacking. In the control system according to the present invention, when the security-sensitive files are stored in the security image file module, only the location cannot be determined by the unauthorized application A', but the information is stored on the hard disk 100 without change. Accordingly, it is preferred that corresponding information be encrypted so as to prevent interpretation even when the security-sensitive files stored on the security image file module 41 may be leaked out by an abnormal method.

The encryption of the access control system of the present invention is performed in such a way as to encrypt data to write on a sector basis and record it in the security image file module 410 when a WRITE command from the security file system module 430 is transferred to the security drive 420, and to decrypt data, which are read from the security image file module 410, on a sector basis and then transfer the decrypted data to the security file system module 430 when a READ command is transferred.

The present invention adopts a symmetric key encryption and/or decryption method, specifically, the block scheme of the symmetric key method. Such a block scheme performs encryption and/or decryption after blocking data on the sector (512 bytes) basis of a disk.

Meanwhile, the above-mentioned terms are defined as below. The term security-sensitive file 440 is a file stored to the security image file module 410 for security reasons, and the term security zone SZ refers to both the security image file module 410 and the security drive 420.

Next, when the application A OR A' attempts to access the security image file module 410, the access control device 1 determines access by determining whether a space at which a corresponding task is to be processed is the general zone GZ or the security zone SZ, and determining whether the application A OR A' has been authorized to access a corresponding file. That is, if it is determined that the application A OR A' has been authorized, only Read can be performed on a corresponding file in the case in which the task space is the general zone GZ, and both reading and writing can be performed on a corresponding file in the case in which the task space is the security zone SZ, as described with reference to FIG. 4. In contrast, if it is determined that the application A OR A' has not been authorized, reading and writing can be performed on a corresponding file in the case in which the task space is the general zone GZ and reading and writing cannot be performed on a corresponding file in the case in which the task space is the security zone SZ.

Figure 7:
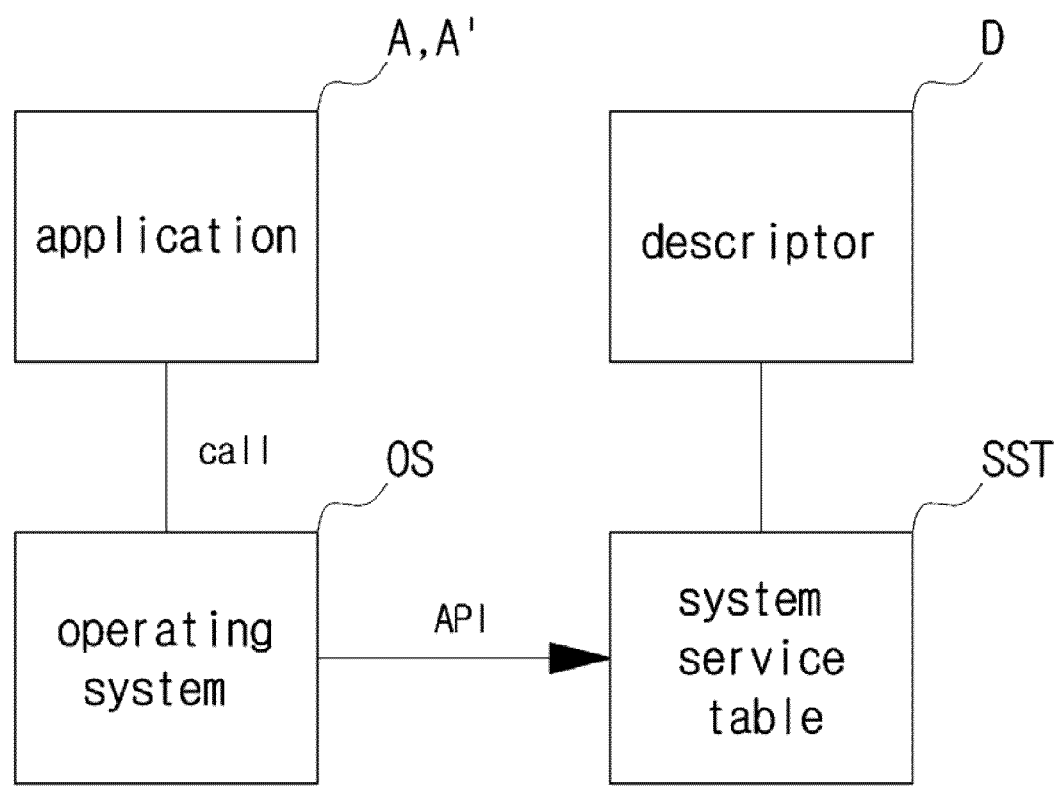
FIG. 7 is a block diagram illustrating the operation of a conventional system service table.

As shown in FIG. 7 (a block diagram illustrating the operation of a conventional system service table), when an application A or A' calls a required function from the OS to access a file that is required for execution, the OS provides the corresponding function to a system service table SST and allows it to be pointed at by a descriptor. Accordingly, the applications A or A' are implemented to be compatible with each other under the OS.

Figure 8:
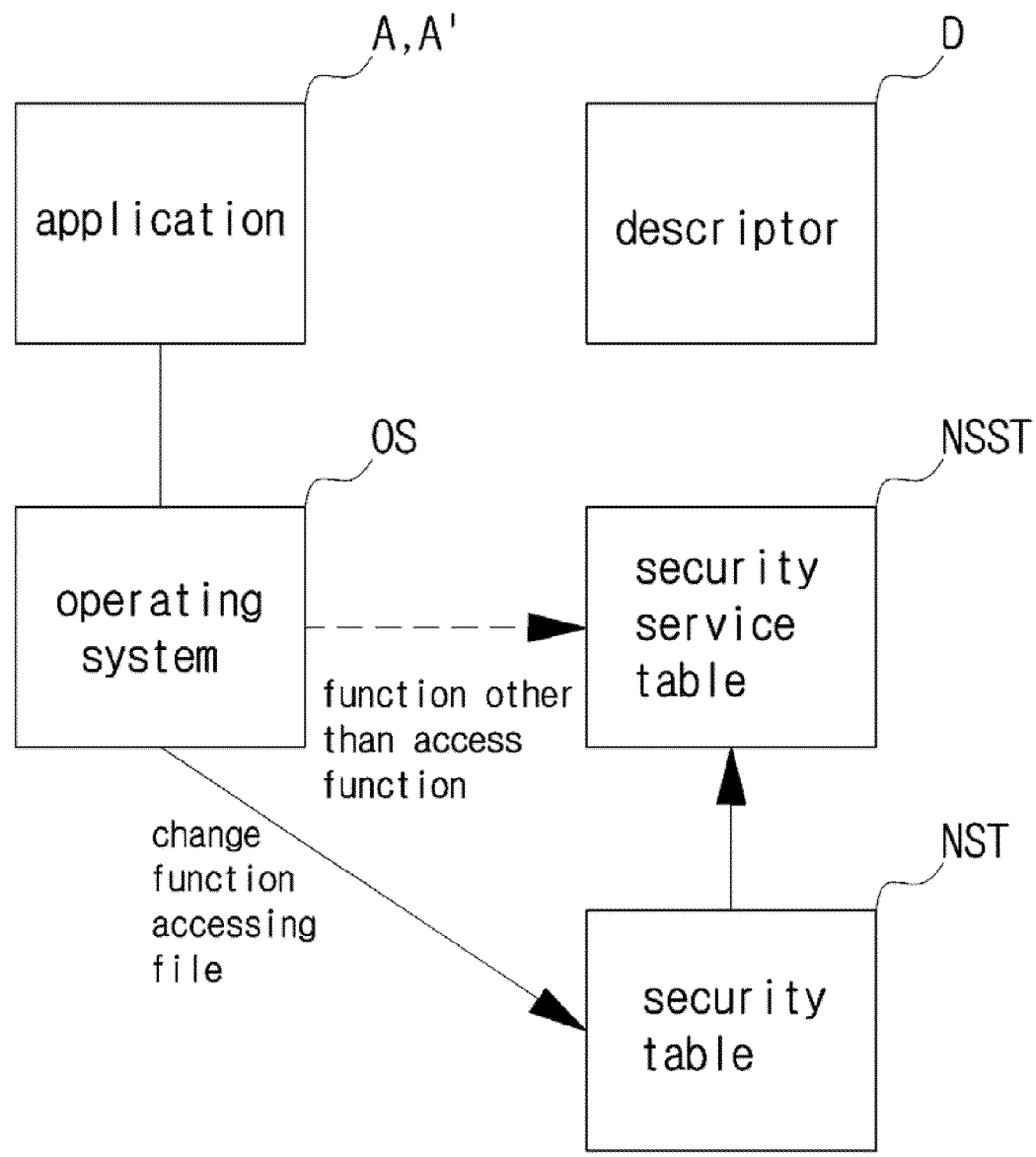
FIG. 8 is a block diagram illustrating the operation of a system service table applied to the access control system according to the present invention.
Figure 9:
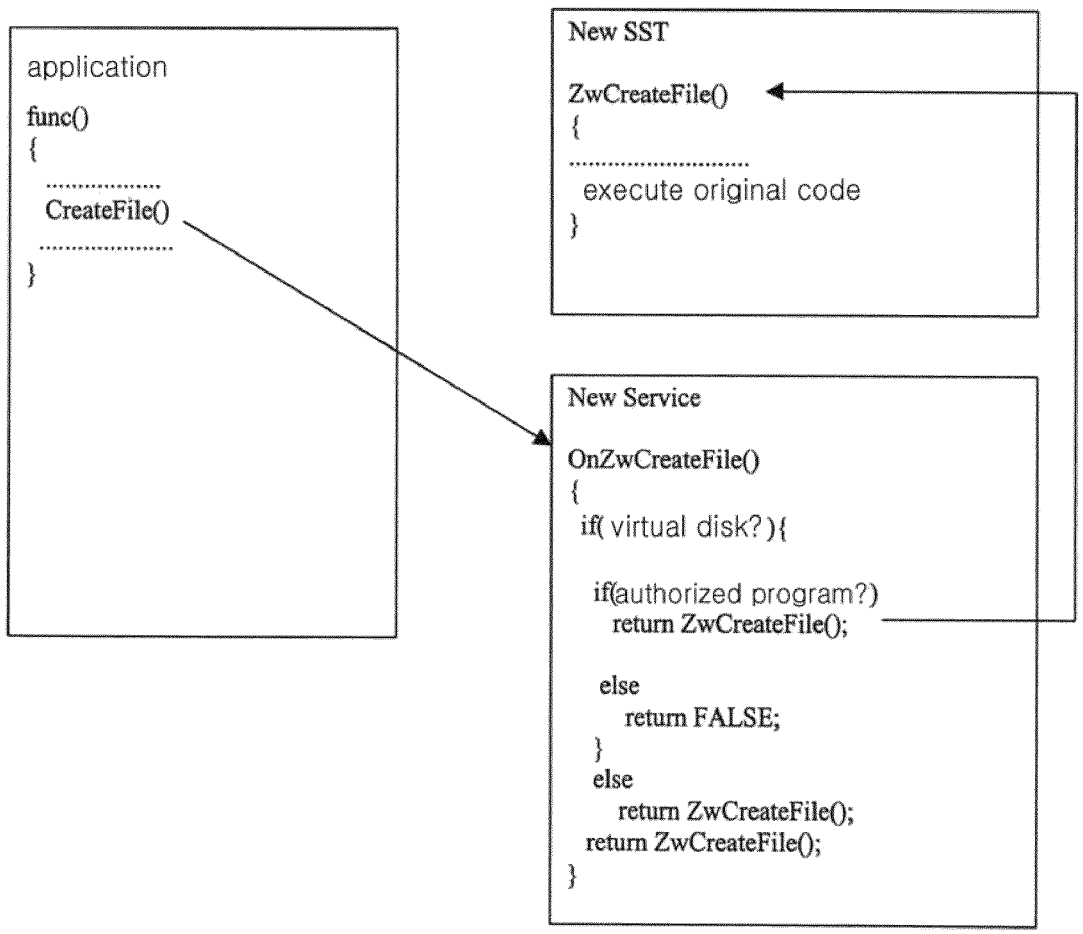
FIG. 9 is an example illustrating a process which processes whether access to a corresponding file has been authorized by an application program (an application) according to the construction of FIG. 5.

Meanwhile, in the access control system according to the present invention, as shown in FIG. 8 (a block diagram illustrating the operation of a system service table applied to the access control system according to the present invention), the existing system service table SST is replaced by a security service table NSST, a security table NST is further included, and the process shown in FIG. 9 (an example showing a process in which whether access to a corresponding file by an application program (an application) has been authorized is processed according to the construction of FIG. 8) is performed.

When the application A or A' calls a required function to access a file required for execution, the OS provides the corresponding function to the security table NST so that the following operation can be performed.

First, when the application A or A' calls a function regarding CreateFile( ), the OS provides ZwCreateFile( ) to the security table NST through NtCreateFile( )(ntdll.dll). In this case, the security table NST changes ZwCreatFile( ) into OnZwCreateFile( ) (function set to prevent the performance of a corresponding function in the present invention), and then determines whether the operation of the corresponding function is performed in the security service table NSST by using logic.

In an embodiment according to the present invention, the function OnZwCreateFile( ) prevents the descriptor from performing pointing as ZwCreateFile( ) is immediately provided to the security service table NSST when the corresponding function CreateFile( ) is requested. Until the logic is completed, the function ZwCreateFile( ) is maintained in the form of the function OnZwCreateFile( ) and the function CreateFile( ) that is requested by the application A or A' is not provided.

In this case, the arbitrarily created function OnZwcreatefile( ) is a function that is formed by changing/replacing the function ZwCreateFile( ) that previously existed in the conventional system service table SST as the security table NST is further installed in the present invention.

Concurrently, the used logic is a determination whether the object file of the called function has been located in the security zone SZ or the general zone GZ, and the application A or A', which call the function, has been authorized. That is, if it is determined that the object file has been located in the security zone SZ, it is determined whether the application has been authorized. If the application has been authorized, the unchanged function ZwCreateFile( ) is provided to the security service table NSST. Otherwise (False) the operation of the corresponding function is stopped. Furthermore, if it is determined that the object file has been located in the general zone GZ, a determination whether the application has been authorized is omitted, and the unchanged function ZwCreateFile( ) is provided to the security service table NSST.

Concurrently, the descriptor D is pointed at the security service table NSST, not the system service table SST.

In FIG. 8, a dashed dot arrow connecting the system service table SST and the security service table NSST shows another type of function call, which is required for the implementation of the applications A or A', other than the functions actually involved in the file access, and the operation of the function is performed by immediately providing the corresponding function to the security service table NSST without processing the logic in the security table NST.

Figure 14:
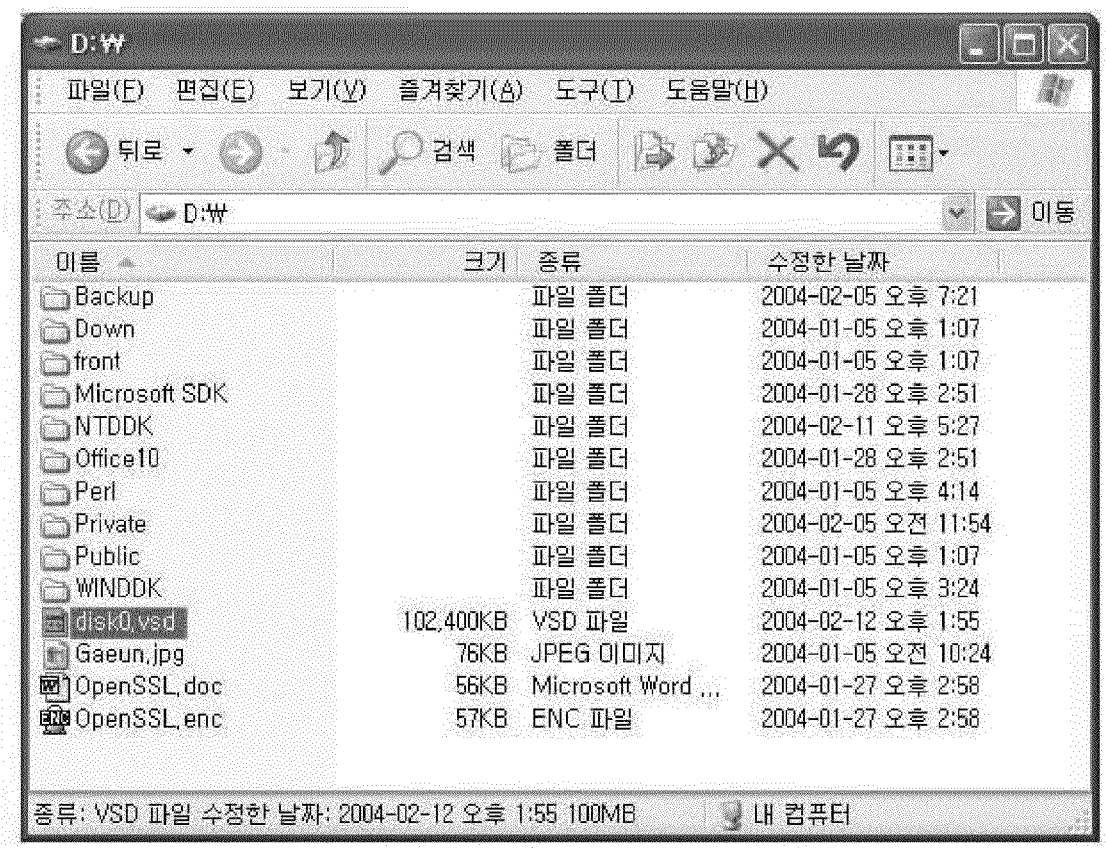
FIG. 14 is a window showing that the security zone of the access control system according to the present invention is recognized as a file.

Meanwhile, as described above, access to the security-sensitive file by a function is not permitted for modules except for by the authorized application A. Accordingly, at the time of the unauthorized application A' attempting access, it is impossible to access the security zone SZ according to the present invention from the beginning because the drive itself is not recognized, as shown in FIG. 12. Furthermore, as shown in FIG. 14 (a window showing a state in which the security zone SZ of the access control system according to the present invention is recognized as a file), it is also impossible to access the security zone SZ using the unauthorized application because the security image file module 410 exists in the form of a file that cannot be opened.

Figure 15:
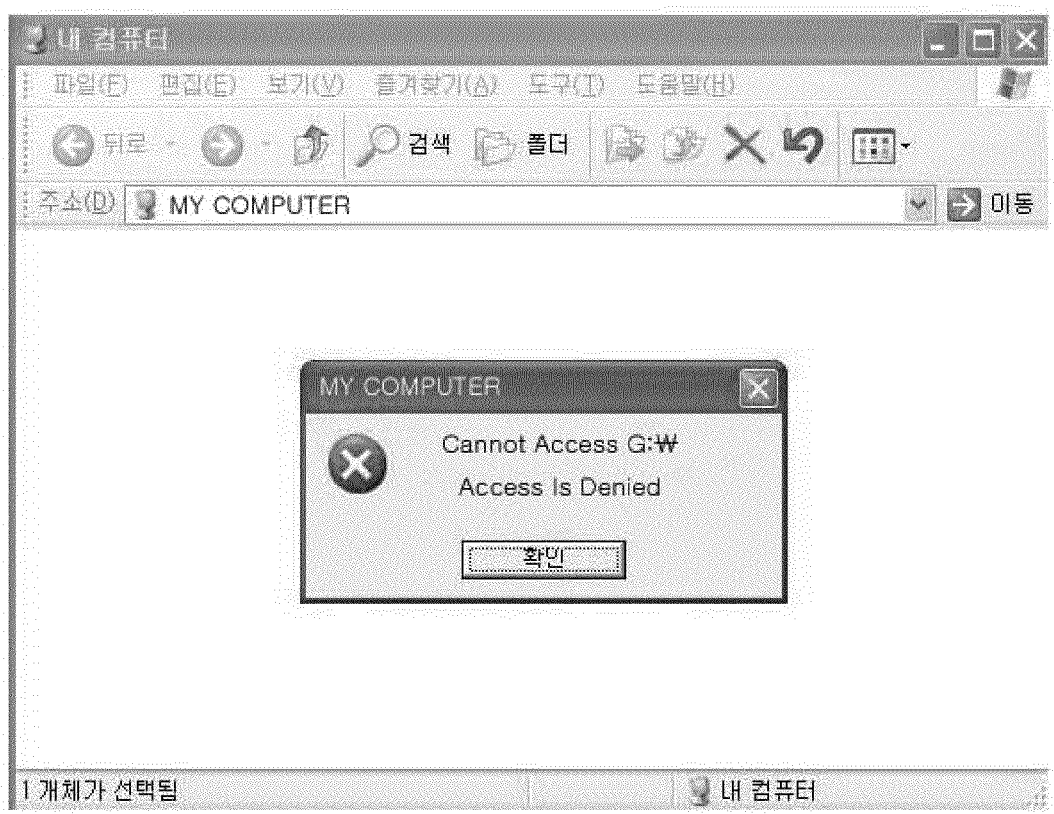
FIG. 15 is a window showing that an access attempted by an unauthorized application is denied at the time of access to the security zone.

FIG. 15 is a window showing that an access attempted by an unauthorized application is denied at the time of access to the security zone SZ, which shows that access is denied when the opening of the security image file module 410, which exists in a file form, is attempted by the unauthorized application A' or OS.

Meanwhile, when the security image file module 410, which occupies a 10 GB space on a hard disk the total capacity of which is 40 GB, is regularly installed, 9 GB is bound to the security image file module 410 even though a security-sensitive file having a size of 1 GigaByte (GB) is stored on the security image file module 410, so that a general file larger than 30 GB cannot be stored. Accordingly, in another embodiment according to the present invention, the use capacity of the security image file module 410 can be flexibly varied.

For this purpose, the present invention employs a sparse file that is utilized on an NT File System (NTFS) basis.

The sparse file allows the OS to recognize that a corresponding space has been occupied by data without occupying all bytes corresponding to the capacity of the large file in a disk space when the need for arbitrarily creating a vast file arises.

That is, in the case of creating a large file of 42 GB, data is written only in a space of 64 kilobytes (KB), which is the start portion of a file, and a space of 64 KB, which is the end portion of the file, without assigning all 42 GB of disk space. The NTFS allocates a physical disk space to a file portion to which a user writes data, through which the sparse file uses only a space of 128 KB on the disk. However, from another aspect, it operates like a file of 42 GB to the OS.

When a 1 GB security-sensitive file is stored on a 40 GB hard disk after the security image file module 410 having 40 GB has been installed thereon, the OS recognizes the capacity of the security image file module 41 as 10 GB. However, when a general file is stored on a general hard disk, a general file larger than 30 GB can be stored thereon, so that the efficiency of space use within the disk is achieved.

The construction of the access control system according to the present invention has been described above, and an access control method using the construction is described below.

Functions ReadFile( ) and WriteFile( ), which are described below, are functions called when the function CreateFile( ) is switched to a reading mode or a writing mode and is then executed. The above functions are separately described according to each mode so that methods of controlling reading and writing from and to a security-sensitive file are clearly distinguished from each other under the access control system according to the present invention.

For reference, CreateFile( ), which is a file handler, is first called to access an arbitrary file through the application, and the reading or writing mode is performed while ZwCreateFile( ), which is provided by calling CreateFile( ), calls ReadFile( ) or WriteFile( ), thus performing reading and writing from and to the corresponding file in the application.

Step 10 of selectively authorizing the applications: The step of designating and authorizing the application A or A' that can access the security zone SZ. Since the embodiment of the method of authorizing the application A or A' has been described, a description thereof is omitted.

Step 20 of the application A or A' calling a function to access the corresponding module: Step 20 corresponds to a start portion of FIG. 10 (a flowchart illustrating a process of reading a file using the application program in the access control system according to the present invention), and is the step of the application A or A' requesting Read of the file and calling the function ReadFile( ) for this purpose.

Step 30 of changing the function and entering a standby state: When step 20 is performed, the function is provided to the security table NST that is included in the access control device 1, and the security table NST changes the function ReadFile( ) into OnZwReadFile( ) and performs the logic.

Step 40 of determining whether an access space of the file is the disk drive or the security drive.

Figure 10:
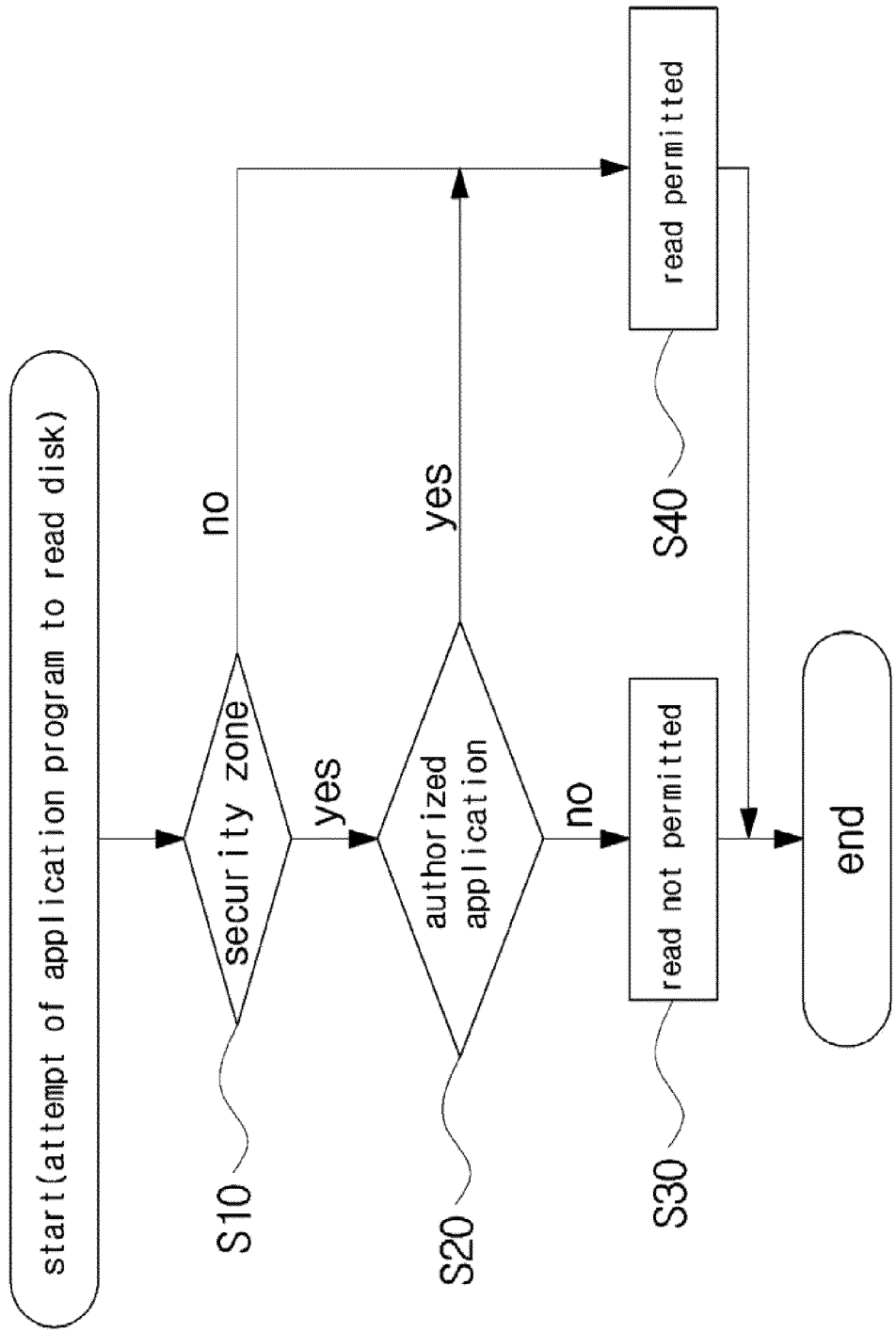
FIG. 10 is a flowchart illustrating a process of reading a file by an application program in the access control system according to the present invention.

Step 40 is the step of determining whether the file is located in the security zone SZ and corresponds to the step S1 of FIG. 10.

Step 50 of restoring the function, which is changed so that the operation thereof is impossible, to the original function and providing the restored function if the space is determined to be the disk drive: If it is determined that the space in which the file is located is the disk drive 300, the security table NST provides ZwReadFile( ), which is a function before being changed into the function OnZwReadFile( ), to the security service table NSST and continues the operation of the function. As a result, the reading of the corresponding file is permitted at step 40.

Step 60 of determining whether the access of the application has been authorized if the access space is determined to be the security drive at step 40: If the access space is determined to be the security drive 420, it is determined whether the application A or A' has been authorized using the following logic at step 20.

Step 70 of restoring the function, which is changed so that the operation thereof is impossible, to the original function if it is determined that the application A or A' has been authorized at step 60: If the application A or A' is determined to be the authorized module, the security table NST provides ZwReadFile( ), which is a function before being changed into the function OnZwReadFile( ), to the security service table NSST and continues the operation of the function. As a result, the reading of the corresponding file is permitted at step 40.

Step 80 of stopping the operation of the corresponding function if it is determined that the application A or A' has been unauthorized: in contrast, if it is determined that the application A or A' has not been authorized, the operation of the corresponding function in the security service table NSST is stopped, and reading is not permitted at step 30.

Figure 11:
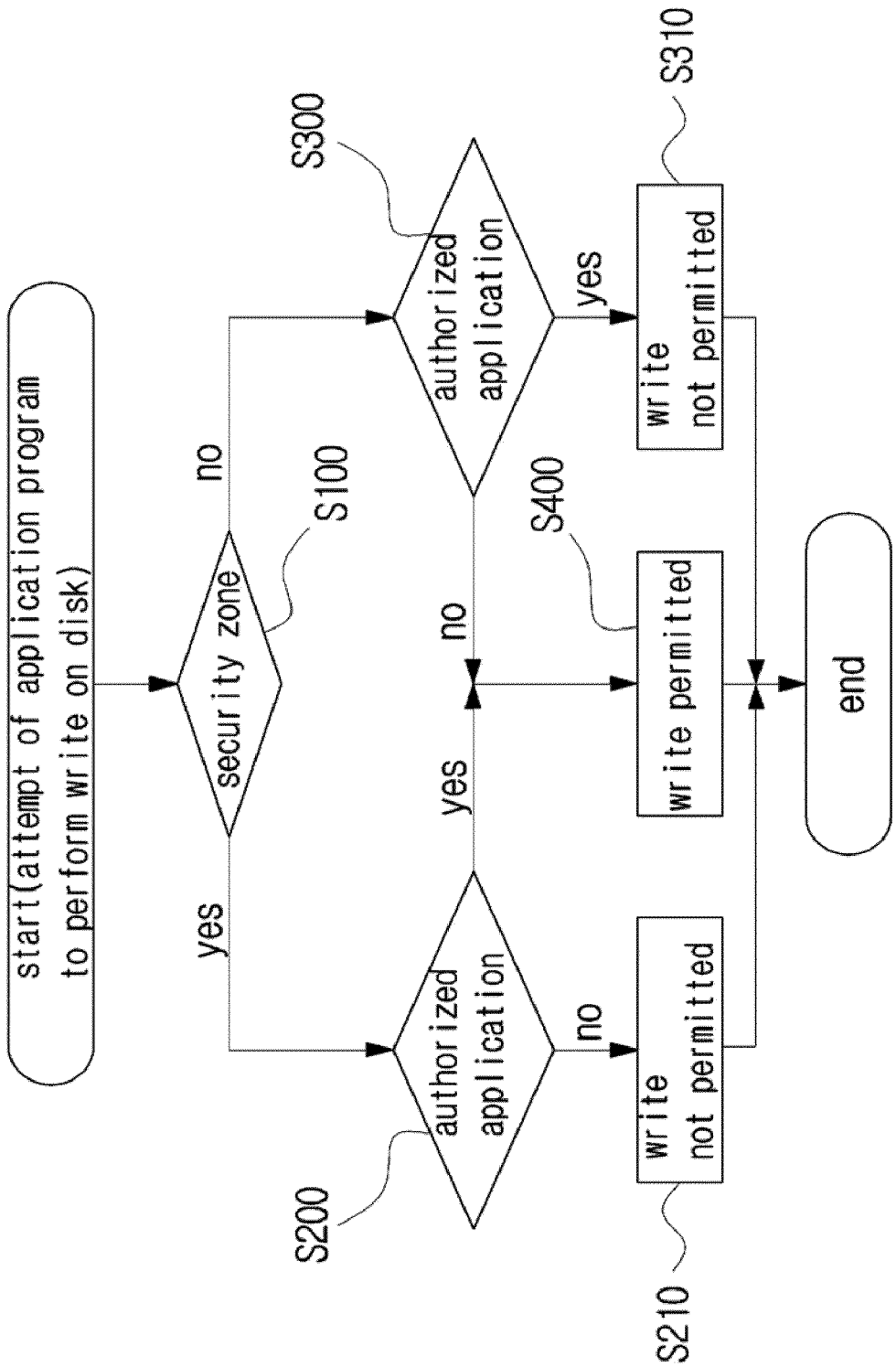
FIG. 11 is a flowchart illustrating a process of writing a corresponding file by an application program in the access control system according to the present invention.

Next, if the function is WriteFile( ), the step 50 further includes the following steps. The steps are described with reference to FIG. 11 (a flowchart illustrating a process of performing writing on a corresponding file using an application program in the access control system according to the present invention). In this case, the function WriteFile( ) is changed into OnZwWriteFile( ) in the security table NST.

Step 50-1 of determining whether the application has been authorized;

In the state in which the access space is determined to be the disk drive 200, it is determined whether the application A or A' calling the corresponding function is the authorized application at step 300.

Step 50-2 of stopping the operation of the corresponding function if the application has been authorized at step 50-2: If it is determined that the application has been authorized at step 50-1, the operation of the corresponding function in the security service table NSST is stopped and writing is not permitted at step 310.

Step 50-3 of restoring the function, which is changed so that the operation thereof is impossible, to the original function and providing the restored function if it is determined that the application has not be authorized at step 50-2: If it is determined that the application has not been authorized at step 50-1, the extend service table NST recovers ZwWeadFile( ), which is a function before being changed into the function OnZwWeadFile( ), and provides the recovered function to the security service table NSST, and the descriptor D performs pointing, so that writing is permitted by the operation of the corresponding function at step 400.

Since the reason why the steps of the method of controlling the WRITE function must be further included in the method of controlling the Read function has been described in detail above, a description thereof is omitted below.

Concurrently, as described above, since the security image file module 410 is located on the existing disk volume in file form, so that only the security image file module 410 can be copied and clipped and, then, access is gained and leakage is performed using the existing file system module 300. Accordingly, the step of encrypting and decrypting data input and/or output between the security image file module 410 and the security drive 420 must be further included.

Concurrently, the control system and method according to the present invention limitedly allow the saving (writing) of data to be performed only in a security zone SZ. Processing may be performed such that it seems to a user that the writing of data is performed in a general zone GZ. That is, since the actual information of the data is saved in the security zone SZ but a symbol (a dummy file), such as an icon, which can be seen by a user, is output to a general zone GZ, it seems that the saving of the data has been performed in the general zone GZ.

Figure 16:
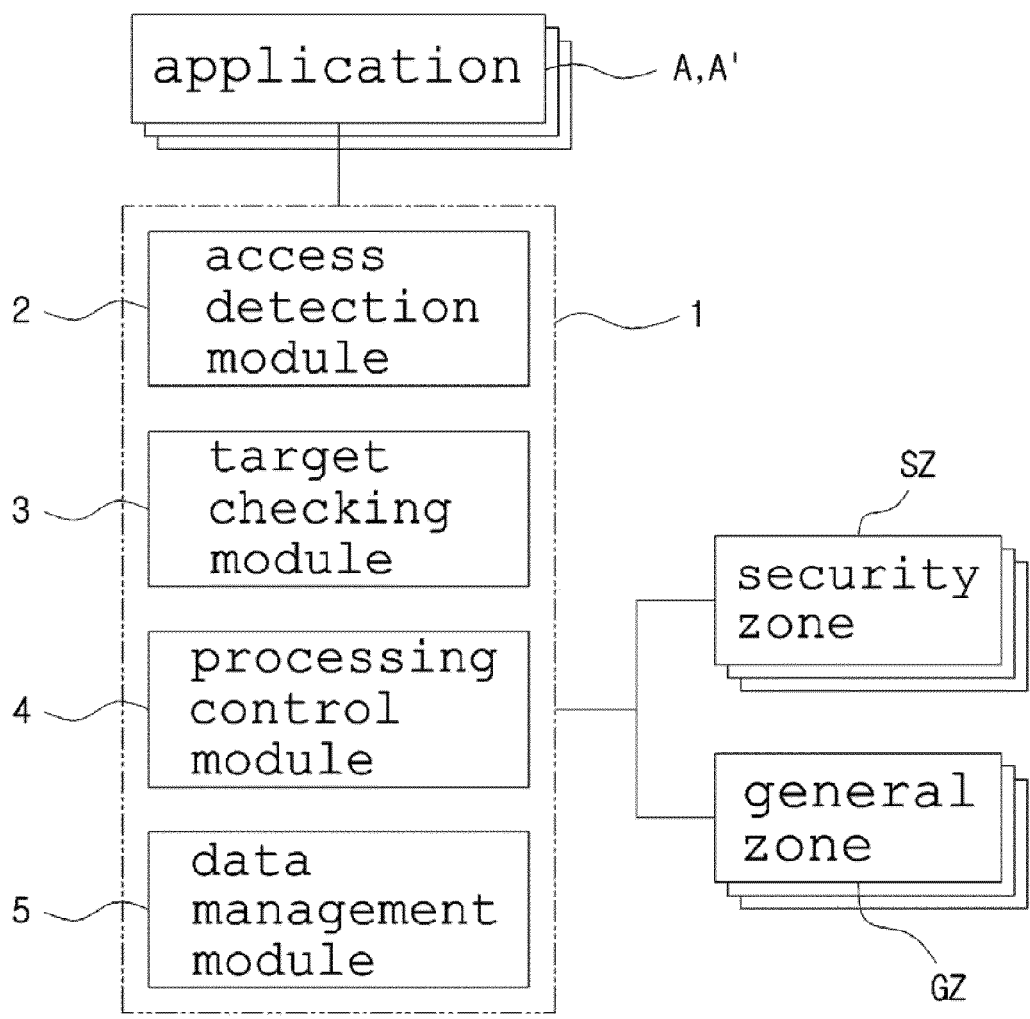
FIG. 16 is a block diagram showing another embodiment of the control system according to the present invention.
Figure 17:
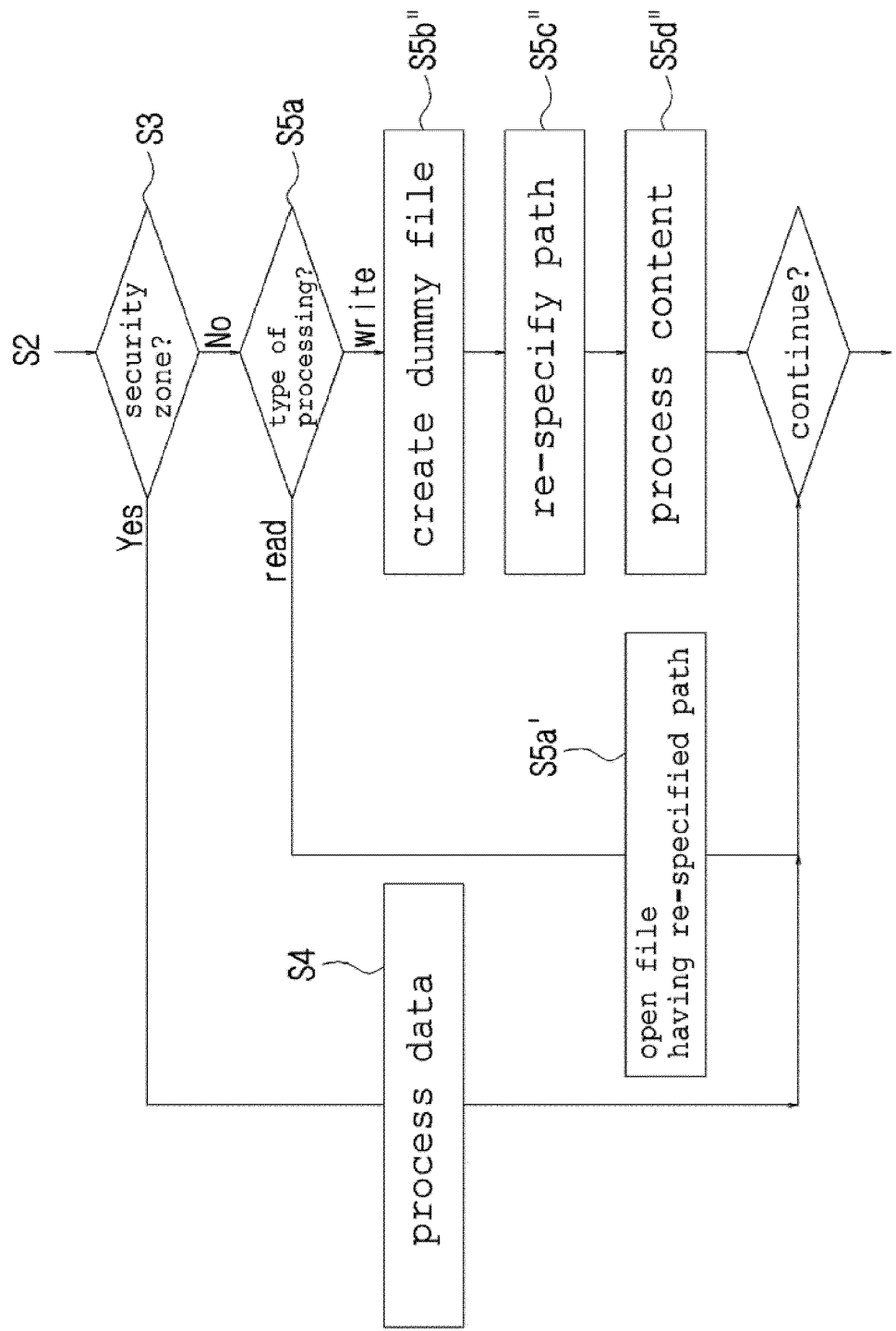
FIG. 17 is a flowchart showing another embodiment of the control method according to the present invention.

FIG. 16 is a block diagram showing another embodiment of the control system according to the present invention, and FIG. 17 is a flowchart showing another embodiment of the control method according to the present invention. The following description will be given in conjunction with these drawings.

S3; Zone Checking Step

Since the description of this step has been given above, a detailed description thereof will be omitted here. An example of this step will be disclosed below.

The access control device 1 is installed on the C drive of a computer, that is, a general zone GZ, and a D drive, that is, a separate security zone SZ, is created in a C drive using the above-described security image file module 410, security drive 420 and security file system module 430. Although the security zone SZ according to the present invention may be set on a drive basis, it may be set on a folder basis. As a result, the security zone SZ may be modified and practiced in various manners regardless of the type of space as long as the zone is a space in which data files can be saved and managed. In the following description, the 'C drive' is representative of a general zone GZ, and the 'D drive' is representative of a security zone SZ.

If the zone in which data will be processed is determined to be the D drive, that is, a security zone SZ, the data processing step S4 is performed.

In contrast, if the zone in which data will be processed is determined to be the C drive, that is, a general zone GZ, the target checking module 3 of the access control module 1 performs the subsequent step of checking the type of event.

S5a; Processing Type Checking Step

If the zone in which the event will be performed is determined to be a general zone at the zone checking step S3, whether the type of event is retrieving (loading) or saving (editing) is determined. Here, 'retrieving' is representative of the outputting and reading of data, and 'saving' is representative of the writing, editing and saving of data.

If the event is reading and the target data is a dummy file, data in the security zone SZ, that is, the original of the former data, is searched for and is then opened (a path re-specification file opening step S5A'). A more detailed description of the re-specification of a path will be given below.

Thereafter, if the event is the saving of data in a general zone GZ, the data management module 5 of the access control device 1 creates a dummy file and then performs a subsequent step.

S5b"; Dummy File Creating Step

According to the control method of the present invention, although the writing (saving) of data is performed in the general zone, the access control device 1 can normally perform the writing of data, actual data can be saved in the security zone SZ, and an icon or the like used to retrieve the actual data is written to the general zone GZ.

For this purpose, the data management module 5 saves the actual data in the security zone SZ, and locates and saves a dummy file linked to the actual data at the corresponding location of the general zone GZ designated by a user. For example, when a user prepares a document in Hangul Word Processor (HWP.exe), that is, one of the widely used general-purpose applications A and A', and then attempts to save the document in A folder of the C drive in the name of a.hwp, the data management module 5 creates file a.hwp having the same name as the former file, that is, the dummy file of the former file a.hwp and saves the latter file in the A folder of the C drive. Accordingly, the path of the dummy file is C:\A\a.hwp.

S5c"; Path Re-Specifying Step

Thereafter, the data management module 5 saves the original file a.hwp prepared by the user in the D drive, that is, a security zone SZ. In detail, the data management module 5 creates the A folder, created by the user, in the D drive, and then specifies a search path so that the original file a.hwp can be saved in the A folder of the D drive. Here, the dummy file of the original data file includes only data about a file name and information used to link to the original data file, but does not include actual data at all.

For reference, in order to effectively manage the original data file to be saved in the D drive, that is, a security zone SZ, by path re-specification, the data management module 5 may create C drive folder as a subordinate directory of the D drive, create the A folder, that is, a subordinate directory, in the created C drive, and then save the original data file therein. Accordingly, the re-specified path of the original data file is D:\C\A\a.hwp.

S5d"; Content Processing Step

After the creation of the original data (file) and the dummy file and the specification of the path have been completed, the data management module 5 causes the information input by the user to be saved not in the dummy file but in the original data file.

Thereafter, the above-described process may be repeated by checking a user's intention to proceed with the processing of content.

For reference, the user may attempt to retrieve the dummy file from the general zone GZ at the processing type checking step S5a, as described above. When such an event occurs, the data management module 5 checks the link information of the dummy file, and retrieves and executes the original data file of the dummy file.

Furthermore, the user may change the location of the dummy file in the general zone GZ. This location changing task corresponds to writing.

The access control device 1 identifies such an event. If the user performs the event of moving the file a.hwp of the A folder of the C drive, that is, a general zone, to the B folder, the data management module 5 changes the path of the corresponding dummy file from C:\A\a.hwp to C:\B\a.hwp, and may additionally change the path of the original data file of the dummy file from D:\C\A\a.hwp to D:\C\B\a.hwp.

In a security zone on a network, in a reading (retrieving or outputting) process, no limitation is imposed on use (or authorization) for each application, but in a writing (saving, copying, cutting, or pasting) process, an application registered in the list is allowed to perform writing only on a security zone, so that the exit of security-sensitive files to the outside can be fundamentally prevented. Furthermore, applications accessing a security zone are automatically registered in a list, so that data processed in an application having a record of accessing the security zone may be allowed to be written only to the security zone SZ.

Furthermore, since the security-sensitive files are separately stored and protected in the security zone SZ even though tasks for encryption or the granting of the authority to use are not performed, a task required for file security is made easy.

Furthermore, the space use of the hard disk, on which general files and security-sensitive files have been stored, can be flexibly implemented by providing variability to the capacity of the security zone SZ.

Furthermore, since the consumption of the time that is required to designate all the range of the hard disk corresponding to the determined capacity to create a disk volume for the determined capacity in the case in which a large-size security zone SZ is installed can be avoided, and the initial time required for the installation of the security zone SZ can be considerably reduced.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A system for controlling exit of saved data from a security zone, comprising an access control device, the access control device comprising an access detection module for detecting access of an application to a security zone and access of an application to a general zone, a target checking module for comparing the application, detected by the access detection module, with a list and then controlling access of the application to the security zone and access of the application to the general zone, and a processing control module for controlling writing of data of the application to the general zone,
    wherein when the processing control module detects a request for writing of data of the security zone to the general zone from the application, the data management module creates a dummy file linked to the data, saves the data in the security zone, and saves the dummy file in the general zone.

2. The system as set forth in claim 1, wherein the target checking module checks a temporary identification code of the application, and temporary identification codes of applications have been registered in the list.

3. The system as set forth in claim 2, wherein the processing control module additionally registers the temporary identification code of the application in the list if the temporary identification code of the application accessing data of the security zone has not been found in the list.

4. The system as set forth in claim 1, wherein the target checking module identifies the application using a unique identification code used for an authorized application, and unique identification codes of authorized applications have been registered in the list.

5. The system as set forth in claim 1, wherein when the application requests writing of data of the security zone to the general zone, the processing control module stops the writing.

6. The system as set forth in claim 1, further comprising:
    a security drive for, in order to set the security zone, occupying a specific space of a hard disk in a file form and then constructing a security image file module, and performing processing so that the security image file module can be recognized as a separate disk volume by an Operating System (OS); and
    a security file system module for, under the control of the access control device, processing reading and writing security files saved in the security image file module and processing the access of the application.

7. The system as set forth in claim 6, further comprising an encryption and decryption module for, when a command to write data to the security drive is received from the security file system module, encrypting the data on a sector basis and then recording it in the security image file module, and, when a command to read the data is received, decrypting the data from the security image file module and then transmitting it to the security file system module.

8. A method of controlling exit of saved data from a security zone, comprising:
    an access detecting step of an access detection module detecting access of an application to a general zone and access of an application to a security zone;
    a list checking step of a target checking module checking the application and a zone, access to which is being attempted by the application; and
    a data processing step of a processing control module detecting a request for writing of data of the security zone to the general zone from the application, and then stopping the writing of the data;
    wherein the data processing step is configured such that in response to a request for writing of data of the security zone to the general zone from the application, the processing control module saves the data in the security zone, and a data management module creates a dummy file linked to the data and then saves it in the general zone.

9. The method as set forth in claim 8, wherein the list checking step comprises:
    a step of a target checking module for searching a list in which temporary identification codes of applications have been registered for the application making an attempt to access; and
    a step of the processing control module registering a temporary identification code of the application which has not been registered in the list.

10. The method as set forth in claim 8, wherein the list checking step is configured such that a target checking module searches a list in which unique identification codes of authorized applications have been registered for the application making an attempt to access, and stops access of the application not found in the list to the security zone.

11. The method as set forth in claim 10, wherein:
    the list checking step is configured such that the target checking module replaces a service table with a security service table; and
    the data processing step is configured such that the processing control module transforms a function which is received by the security service table first, and, if a work space of the authorized application is the security zone, restores and processes the transformed function, and, if the work space is the general zone, executes a security table which stops restoration of the transformed function.

12. The method as set forth in claim 8, wherein the data management module creates a directory, corresponding to a directory of the general zone in which the dummy file is saved, in the security zone and saves the data linked to the dummy file therein.

* * * * *